US010187891B2

(12) United States Patent
Yang

(10) Patent No.: US 10,187,891 B2
(45) Date of Patent: Jan. 22, 2019

(54) METHODS OF SCHEDULING A CARRIER COMPONENT

(75) Inventor: Tao Yang, PuDong Jinqiao Shanghai (CN)

(73) Assignee: ALCATEL LUCENT, Paris (FR)

( * ) Notice: Subject to any disclaimer, the term of this patent is extended or adjusted under 35 U.S.C. 154(b) by 309 days.

(21) Appl. No.: 13/817,037

(22) PCT Filed: Aug. 9, 2011

(86) PCT No.: PCT/IB2011/002081
§ 371 (c)(1),
(2), (4) Date: Feb. 14, 2013

(87) PCT Pub. No.: WO2012/023040
PCT Pub. Date: Feb. 23, 2012

(65) Prior Publication Data
US 2013/0142162 A1 Jun. 6, 2013

(30) Foreign Application Priority Data
Aug. 16, 2010 (CN) .......................... 2010 1 0254849

(51) Int. Cl.
H04W 72/04 (2009.01)
H04L 5/00 (2006.01)
(52) U.S. Cl.
CPC ......... *H04W 72/0453* (2013.01); *H04L 5/001* (2013.01); *H04L 5/0042* (2013.01); *H04L 5/0094* (2013.01)
(58) Field of Classification Search
None
See application file for complete search history.

(56) References Cited

U.S. PATENT DOCUMENTS

2005/0085265 A1    4/2005   Laroia et al.
2011/0134774 A1*   6/2011   Pelletier et al. .............. 370/252
(Continued)

FOREIGN PATENT DOCUMENTS

CN    101478824 A    7/2009
JP    2012-39467     2/2012
(Continued)

OTHER PUBLICATIONS

Nokia Siemens Networks (Rapporteur), "Corrections and new Agreements on Carrier Aggregation," 3$^{rd}$ Generation Partnership Project (3GPP), XP050451450, 3GPP TSG-RAN WG2 Meeting #70bis, R2-104195, pp. 1-15, Stockholm, Sweden, Jun. 28-Jul. 2, 2010.
HTC, "CIF Content Mapping," 3$^{rd}$ Generation Partnership Project (3GPP), XP050449500, 3GPP TSG-RAN WG1 #61bis, R1-103609, pp. 1-3, Dresden, Germany, Jun. 28-Jul. 2, 2010.
(Continued)

*Primary Examiner* — Joshua Kading
(74) *Attorney, Agent, or Firm* — Fay Sharpe LLP

(57) ABSTRACT

The present invention provides solutions of scheduling a carrier component between a base station and a user equipment by assigning a CIF. In one embodiment of the present invention, there is provided a method, in a base station, of scheduling a carrier component for a user equipment, including: transmitting a configuration message to configure cells of the user equipment, wherein the configuration message includes respective first information for carrier identification of each cell. The technical solutions provided in the present invention can guarantee the flexibility of carrier component assignment.

5 Claims, 2 Drawing Sheets

(56) References Cited

U.S. PATENT DOCUMENTS

| | | | |
|---|---|---|---|
| 2011/0205978 A1* | 8/2011 | Nory | H04L 5/0007 370/329 |
| 2011/0243066 A1* | 10/2011 | Nayeb Nazar | H04L 1/007 370/328 |
| 2011/0299489 A1 | 12/2011 | Kim et al. | |
| 2011/0317645 A1* | 12/2011 | Jen | 370/329 |
| 2012/0113941 A1* | 5/2012 | Chung et al. | 370/329 |

FOREIGN PATENT DOCUMENTS

| | | |
|---|---|---|
| JP | 2013-507821 A | 3/2013 |
| WO | WO 2010/048178 A1 | 4/2010 |
| WO | WO 2010/068069 A2 | 6/2010 |

OTHER PUBLICATIONS

ETSI MCC, "Report of 3GPP TSG RAN WG2 meeting #70, Montreal, Canada, May 10-14, 2010," 3$^{rd}$ Generation Partnership Project (3GPP), XP050451445, TSG-RAN Working Group 2 meeting #70bis, R2-104199, pp. 1-154, Stockholm, Sweden, Jun. 28-Jul. 2, 2010.

International Search Report for PCT/IB2011/002081 dated Dec. 14, 2012.

Pantech, "CA Handover Considerations," 3GPP TSG-RAN WG2 Meeting #70, Montreal, Canada, May 10-14, 2010, Agenda Item 7.1.5, Document for Discussion and Decision, pp. 1/3-3/3.

Alcatel-Lucent, Alcatel-Lucent Shanghai Bell, "RRC Connection Reconfiguration Message Structure for CA," TGS-RAN WG2#70bis, Jun. 28-Jul. 2, 2010, Stockholm, Sweden, Agenda Item 7.1.2.4, Document for Discussion, pp. 1-6.

\* cited by examiner

METHODS OF SCHEDULING A CARRIER COMPONENT

FIELD OF THE INVENTION

The present invention relates to a wireless communication technology, and more particularly, to a technology of cross-scheduling of multiple carrier components in a carrier aggregation scenario.

BACKGROUND OF THE INVENTION

In LTE-A, wider bandwidth, up to 100 MHz, is used to satisfy higher data rate requirement. For backward compatibility, the 100 MHz bandwidth is separated into multiple carrier components, each of which has the maximum width of 20 MHz. Therefore, each user may support up to 5 carrier components. For each user equipment (UE), there is one primary carrier component (PCC) and optionally one or more secondary carrier components (SCC), with the former always keeping active. Another related concept is primary cell (Pcell) and secondary cell (Scell) adopted by 3GPP, wherein a primary cell refers to a downlink/uplink PCC pair, and a secondary cell refers to a downlink/uplink SCC pair or a single downlink carrier. A primary cell is established by R8 radio resource control (RRC) connection procedure, and a secondary cell is established by new Release-10 secondary cell adding message. It has been agreed that each secondary cell will be assigned with one cell index to identify its corresponding downlink and uplink carrier components or corresponding downlink carrier.

Cross-scheduling has been agreed for LTE-A carrier aggregation so that physical downlink control channel (PDCCH) in one carrier component can indicate resource information of other carrier component(s). For this purpose, a carrier identification field (CIF) is inserted into PDCCH to indicate target carrier component(s) at which the resource information is located. One basic consensus on CIF is that CIF and cell index should be defined separately. Another consensus is that the downlink/uplink carrier components of the same cell linked by system information block 2 (SIB2) should be scheduled by the same downlink carrier component. And it is still inconclusive about CIF assignment and scheduling.

A solution of adopting implicit CIF assignment for each carrier component has been proposed. For example, the CIF is determined on the basis of the cell index of a carrier component or frequency information of a carrier component. Such kind of implicit assignment helps to save signaling overhead, but the gain is very small since at most 15 bits can be saved even in a case where a UE is configured with 5 carrier components. On the other hand, this implicit CIF assignment based on cell index violates the current consensus that CIF and cell index should be defined separately. Another drawback is that this solution may probably cause specification complexity when the CIF of a carrier component is reconfigured (e.g., the CIF of a carrier component is reconfigured from one PDCCH of a downlink carrier component to another) and also restrict reconfiguration flexibility (e.g., the network may need to assign a particular CIF value for a carrier component, instead of any cell order or frequency order). Another drawback of this solution is that potential loss of synchronization may happen with the CIF of the carrier components between an evolved Node B (eNB) and a UE. For example, one possibility for primary cell index assignment is to reserve a default value for the primary cell. Hence for primary cell change due to reconfiguration where the current primary cell is changed into a new secondary cell, the cell index of the primary cell needs to be changed, and its CIF should also be changed according to this implicit solution, thereby giving the chance of mismatch of CIF value of carrier components between the eNB and the UE. In addition, this implicit assignment method must further define a specific mapping strategy between CIF and cell index or frequency information, thereby increasing specification complexity is caused.

SUMMARY OF THE INVENTION

To solve the aforementioned problems in the prior art, the present invention provides solutions of scheduling a carrier component between a base station and a user equipment by assigning a CIF.

In one embodiment of the present invention, a method, in a base station, of scheduling a carrier component for a user equipment is provided. The method includes: transmitting a configuration message to configure cells of the user equipment, wherein the configuration message includes respective first information for carrier identification of each cell.

In another embodiment of the present invention, a method, in a base station, of scheduling a carrier component for a user equipment is provided. The method includes: transmitting a handover command for the handover of the user equipment, wherein the handover command includes an information element carrying first information of each cell, the first information being utilized for carrier identification.

In yet another embodiment of the present invention, a method, in a base station, of scheduling a carrier component for a user equipment is provided. The method includes: transmitting a RRC layer message relating to primary cell change of the user equipment, wherein the RRC layer message includes: a first information to indicate a carrier identification of a cell; and at least one of a second information to indicate the index(es) of the cell(s) served by the cell and a third information to indicate an index of a cell serving the cell.

The technical solutions provided by the present invention can guarantee the flexibility of carrier component configuration, avoid the need for a specific CIF mapping strategy, and reduce specification complexity.

BRIEF DESCRIPTION OF THE DRAWINGS

Other features, objectives and advantages of the present invention will become more apparent after reading the following detailed description of non-limiting embodiments, with reference to the accompanying drawings, wherein below.

DETAILED DESCRIPTION OF PREFERRED EMBODIMENTS

In the present invention, some terms are defined as follows:

Cell: a downlink/uplink carrier component pair between a base station and a user equipment.

Primary cell: a downlink/uplink primary carrier component pair.

Secondary cell: a downlink/uplink secondary carrier component pair.

Figure 1:
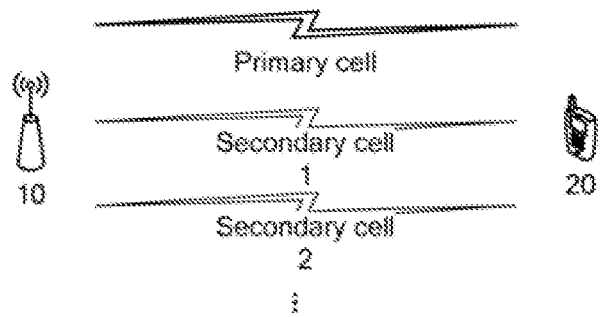
FIG. 1 is a block diagram illustrating a system according to an embodiment of the present invention.

FIG. 1 is a block diagram illustrating a system according to an embodiment of the present invention. As shown, the mobile communication system includes a base station 10 and a user equipment 20. As shown, one primary cell and one or more secondary cells are included between the base station 10 and the user equipment 20.

Figure 2:
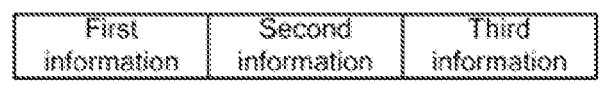
FIG. 2 is a structural diagram illustrating an information element for a carrier component pair according to an embodiment of the present invention.

FIG. 2 is a structural diagram illustrating an information element for a carrier component pair according to an embodiment of the present invention. The information element shown is usually assigned to each cell in some control messages to indicate configuration of the cell. A first information is utilized to carry CIF information, i.e., information for carrier identification. A second information is utilized to indicate cell index(es) of secondary cell(s) that a certain cell is intended to serve. And a third information is utilized to indicate the cell index of a cell serving a certain cell. The second and third information is invalid for the configuration of a self-scheduling cell. The second and third information is needed only for the configuration of a cross-scheduling cell. And those skilled in the art can understand that the information element structure shown in FIG. 2 is exemplary rather than restrictive, and that in different implementations, the first information, the second information, and the third information in the information element may employ any permutation and combination, depending on the requirements of specific applications. Because the CIF here is defined in each cell, the downlink/uplink carrier components of a cell linked by SIB2 share the same CIF. Therefore, only one information element is needed for each cell, and there is no need to design information elements separately for the downlink carrier component and the uplink carrier component. This helps to optimize the size of carrier component management messages.

Figure 3:
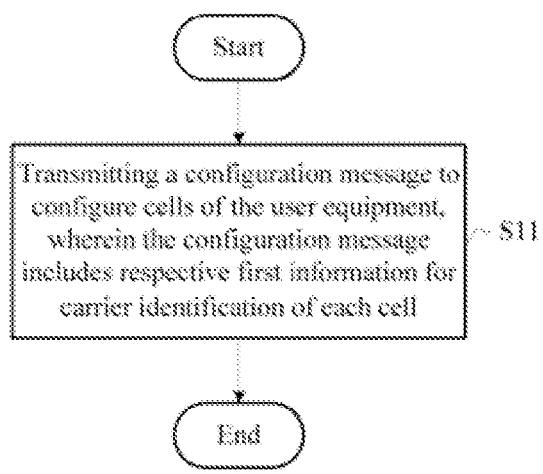
FIG. 3 is a flowchart illustrating a method, in a base station, of scheduling a carrier component for a user equipment according to an embodiment of the present invention.

FIG. 3 is a flowchart illustrating a method, in a base station, of scheduling a carrier component for a user equipment according to an embodiment of the present invention. Description will be given in connection with FIGS. 1-3 as follows.

As shown, the flowchart of the method includes a step S11.

When the base station 10 schedules a carrier component for the user equipment 20, in the step S11, the base station 10 transmits a configuration message to configure cells of the user equipment 20, wherein the configuration message includes respective first information for carrier identification of each cell.

Based on the value of the first information of a certain cell, the user equipment 20 may get to know whether the resource is allocated to this cell or other cell(s). Resource allocation to the cell itself corresponds to self-scheduling, and resource allocation to other cell(s) corresponds to cross-scheduling. Specifically, the first information may employ 3 bits to indicate which cell a corresponding resource pertains to.

If the primary cell is configured to serve other secondary cell(s), the first information of the primary cell is mandatory; otherwise, it is dispensable. Hence it is dispensable to assign CIF value for a primary cell during its setup procedure. The reason is that primary cell setup is based on LTE-A Release-8 RRC connection setup procedure, and thus backward compatibility of the system can be guaranteed without introducing new information element such as the first information into primary cell setup procedure.

In one embodiment of the present invention, the configuration message transmitted from the base station 10 to the user equipment 20 to reconfigure a primary cell includes a first information and a second information of the primary cell. The first information includes a carrier identification of the primary cell to indicate that corresponding resource pertains to the primary cell. And the second information is utilized to indicate cell index(es) of secondary cell(s) that the primary cell is intended to serve.

In one embodiment of the present invention, the configuration message transmitted from the base station 10 to the user equipment 20 to add or update a secondary cell includes a first information of the secondary cell, and at least one of a second information and a third information thereof. The first information is utilized to indicate that the secondary cell is a cross-scheduling cell. When the secondary cell is intended to serve other secondary cell(s), the configuration message further includes a second information of the secondary cell to indicate cell index(es) of the other secondary cell(s) that the secondary cell is intended to serve. When the secondary cell is served by other cell(s), the configuration message further includes a third information of the secondary cell to indicate cell index(es) of the other cell(s) serving the secondary cell. If the third information is empty, the secondary cell is scheduled by its own downlink carrier component. If the second information is empty, the secondary cell doesn't serve other secondary cell(s). And if both the second information and the third information is empty, the first information is dispensable.

According to the above description, the first information assignment of a primary cell may be achieved via the following options:

Option 1: a default first information value is reserved for the primary cell.

Option 2: the first information of the primary cell is assigned in the configuration message used to reconfigure the primary cell when the primary cell is configured to serve other secondary cell(s).

Option 3: when the primary cell is configured to serve other secondary cell(s), the first information of the primary cell is assigned in the configuration message used to add or update the secondary cell(s).

And the first information assignment of a secondary cell may be achieved via the following options:

Option 1: when a secondary cell is added, the first information of the secondary cell is assigned in the configuration message used to add the secondary cell.

Option 2: when a secondary cell is configured to serve other secondary cell(s), the first information of the secondary cell is assigned in the configuration message used to update the secondary cell.

Option 3: when other cell(s) (a primary cell or other secondary cell(s)) is/are configured to serve a secondary cell, the first information of the secondary cell is assigned in the configuration message relating to the other cell(s).

For primary cell reconfiguration message possibly used to configure the primary cell to serve other secondary cell(s), two types of information element are needed:

A first information is utilized to assign a CIF value for the primary cell; and

A second information is utilized to identify a list of secondary cell(s) that the primary cell is intended to serve, wherein the list includes index information of the secondary cell(s) that the primary cell is intended to serve.

If the second information is empty, the first information may be empty too.

For secondary cell adding/updating message used to add a new secondary cell or to reconfigure a currently configured secondary cell, the following information elements are needed:

A first information is utilized to assign a CIF value for the secondary cell. If the CIF of the secondary cell was assigned previously, or the secondary cell is scheduled by itself and doesn't serve any other secondary cell, the first information may be empty.

A second information is utilized to identify a list of other secondary cell(s) that the secondary cell is intended to serve.

A third information is utilized to identify information of downlink carrier component(s) scheduled by the secondary cell, i.e., information of downlink carrier component(s) serving the secondary cell, including cell index(es) of the primary cell or secondary cell(s). If the third information is empty, the secondary cell is scheduled by itself.

A fourth information is utilized to assign a CIF value for a primary cell if the primary cell is intended to serve the secondary cell. If the CIF of the primary cell was assigned previously, the fourth information element may be empty.

Accordingly, the CIF of a secondary cell may be assigned by the following options:

Option 1: the CIF value of the secondary cell is assigned in a secondary cell adding message.

Option 2: the CIF value of the secondary cell is assigned in a secondary cell adding/updating message when the secondary cell is scheduled by other secondary cell(s).

Option 3: the CIF value of the secondary cell is assigned in a secondary cell adding/updating message when the secondary cell is intended to serve other secondary cell(s).

Option 4: the CIF value of the secondary cell is assigned in a primary cell reconfiguration message when a primary cell is intended to serve the secondary cell.

Figure 4:
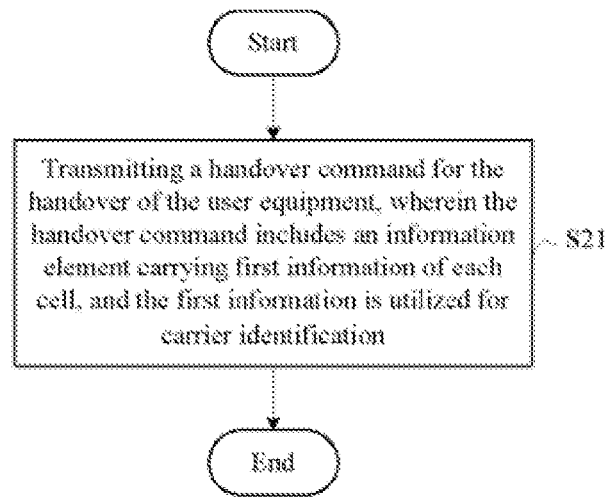
FIG. 4 is a flowchart illustrating a method, in a base station, of scheduling a carrier component for a user equipment according to another embodiment of the present invention.

FIG. 4 is a flowchart illustrating a method, in a base station, of scheduling a carrier component for a user equipment according to another embodiment of the present invention. Description will be given in connection with FIGS. 1-4 as follows.

As shown in FIG. 4, the flowchart of the method includes a step S21.

When the base station 10 schedules a carrier component for the user equipment 20, in the step S21, the base station 10 transmits a handover command for the handover of the user equipment 20, wherein the handover command includes an information element carrying first information of each cell, and the first information is utilized for carrier identification. In general, this corresponds to a scenario where the access service of the user equipment 20 is handed-over from another base station to the base station 10.

In one embodiment of the present invention, the handover command transmitted from the base station 10 for the handover of the user equipment 20 includes the first information of a cross-scheduling cell. And the first information of remaining cross-scheduling cell(s) is deducible according to the first information of the cross-scheduling cell.

In the handover scenario, one important issue is that a base station may include information of a primary cell and optionally information of one or more secondary cells. In general, there are two options for CIF assignment in the handover scenario: one is to assign the CIF value in the handover command; the other is to assign the CIF value after the handover command and before transmission/reception operation. Regarding the second option, the method in the embodiment shown in FIG. 3 may be employed to assign the CIF value.

Regarding the first option above, the CIF may be assigned for a primary cell and configured secondary cell(s) by the following solution.

An information element of first information of the primary cell and each configured secondary cell is included in the handover command.

If a default value is employed as the CIF value of the primary cell, the first information element may be empty.

When the primary cell is configured to serve other secondary cell(s), the first information element is mandatory.

For a configured secondary cell, when the secondary cell is scheduled by other cell(s) (secondary cell(s) or the primary cell) or is intended to serve other secondary cell(s), the first information element is mandatory. And when the secondary cell is neither scheduled by other cell(s) nor intended to serve other secondary cell(s), the first information element may be empty.

Specifically, CIF value may be assigned for only one cell, and CIF value of other cells may be calculated according to that CIF value.

More specifically, the handover command may include the first information element of only the primary cell for its CIF value assignment. And the CIF value of other configured secondary cells may be calculated according to the CIF value of the primary cell.

Alternatively, the handover command may include the first information element of only the first secondary cell for its CIF value assignment. And the CIF value of the primary cell and other configured secondary cells may be calculated according to the CIF value of the first secondary cell.

When the primary cell is configured to serve other secondary cell(s), the handover command further includes a secondary information element of the primary cell to include a list of configured secondary cell(s) that the primary cell is intended to serve.

When a secondary cell is configured to serve other secondary cell(s), the handover command further includes a secondary information element of the secondary cell to indicate the other secondary cell(s) that the secondary cell is intended to serve.

When a certain cell is configured to be scheduled by other cell(s), the handover command further includes a third information element of the secondary cell to indicate its scheduling cell.

Figure 5:
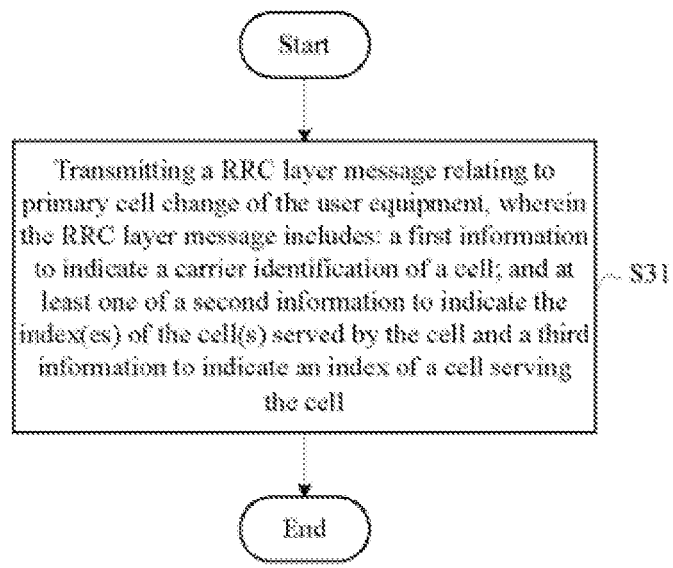
FIG. 5 is a flowchart illustrating a method, in a base station, of scheduling a carrier component for a user equipment according to yet another embodiment of the present invention.

Another important issue associated with the design of CIF assignment is primary cell change without handover. FIG. 5 is a flowchart illustrating a method, in a base station, of scheduling a carrier component for a user equipment according to yet another embodiment of the present invention. Description will be given in connection with FIGS. 1-5 as follows.

As shown in FIG. 5, the flowchart of the method includes a step S31.

When the base station 10 schedules a carrier component for the user equipment 20, in the step S31, the base station 10 transmits a RRC layer message relating to primary cell change of the user equipment 20. The RRC layer message includes: a first information to indicate a carrier identification of a cell; and at least one of a second information to indicate the index(es) of the cell(s) served by the cell and a third information to indicate an index of a cell serving the cell.

In one embodiment of the present invention, a cross-scheduling primary cell of the user equipment 20 is changed to a newly configured secondary cell, and the RRC layer message transmitted by the base station 10 and relating to primary cell change of the user equipment 20 includes: the first information to indicate the carrier identification of the newly configured secondary cell; and at least one of the second information to indicate the index(es) of the cell(s) served by the newly configured secondary cell and the third information to indicate the index of the cell serving the newly configured secondary cell.

If the CIF was assigned for the newly configured secondary cell previously, the CIF may be reused and the first information element is dispensable.

If the newly configured secondary cell is scheduled by itself and doesn't schedule any other secondary cell, the first information element may be empty. In other words, the newly configured secondary cell isn't configured with cross-scheduling function.

In one embodiment of the present invention, a cross-scheduling secondary cell of the user equipment 20 is changed to a new primary cell, and the RRC layer message transmitted by the base station 10 and relating to primary cell change of the user equipment 20 includes: the first information of the new primary cell to indicate the carrier identification of the new primary cell; and the second information of the primary cell to indicate the index(es) of the cell(s) served by the new primary cell.

Unless a default value is employed, the first information element of the new primary cell is utilized to assign the CIF for the new primary cell.

In one embodiment of the present invention, a newly configured cell of the user equipment 20 is changed to a new primary cell, and the RRC layer message transmitted by the base station 10 and relating to primary cell change of the user equipment 20 includes: the first information of the new primary cell to indicate the carrier identification of the new primary cell; and the second information of the new primary cell to indicate the index(es) of the cell(s) served by the new primary cell.

In a variation example where the CIF was assigned for the new primary cell previously, the cell may reuse the previously assigned CIF and the first information in the above RRC layer message may be empty.

In one embodiment of the present invention, the information element for each cell includes a fourth information to indicate whether the first information of the corresponding cell is mandatory or optional. Those skilled in the art can understand that the base station 10 may add the fourth information to the aforementioned configuration message utilized to configure the cells of the user equipment 20, the handover command for the handover of the user equipment 20, and the RRC layer message relating to primary cell change of the user equipment 20.

When the fourth information received by the user equipment 20 indicates that the corresponding first information is mandatory, the user equipment 20 monitors the corresponding first information on the PDCCH, and configures or updates the CIF value of the corresponding cell according to the monitored first information.

When the fourth information received by the user equipment 20 indicates that the corresponding first information is optional, the user equipment 20 may not monitor the first information in the same downlink frame.

In one embodiment of the present invention, the CIF assignment is valid in all configured cells. In other words, the CIF of each cell should be unique among all configured cells, and the life period of the CIF is valid until the cell is released. The advantage of this option is that when a downlink carrier component reconfiguration is scheduled, there is no need to assign other CIFs, thereby corresponding RRC layer messages is reduced.

In another embodiment of the present invention, the CIF assignment is valid in the cells scheduled by the same downlink carrier component. In other words, the CIF of each cell is unique among the cells scheduled by the same downlink carrier component. The life period of the CIF continues until the scheduling downlink carrier component is reconfigured. This means that when a scheduling downlink carrier component of a cell is reconfigured, its CIF must be reconfigured to avoid collision with other cells scheduled by the same downlink carrier component.

Those skilled in the art can understand that the above embodiments are exemplary rather than restrictive. Combination of the different technical features in the different embodiments can be made to achieve an adventurous effect. Other variations to the disclosed embodiments can be understood and implemented by those skilled in the art, from a study of the drawings, the disclosure, and the appended claims. In the claims, any form of the word "comprise" does not exclude other elements or steps; the indefinite article "a" or "an" does not exclude a plurality; and the words "first" and "second" are utilized to identify a name and not to mean any particular order. Any reference signs in the claims should not be construed as limiting the scope. A single hardware or software module may fulfill the functions of several items recited in the claims. The mere fact that certain technical features are recited in mutually different dependent claims does not indicate that a combination of these features cannot be made to achieve an adventurous effect.

The invention claimed is:

1. A method, in a base station, of scheduling a carrier component for a user equipment, comprising:
    defining a carrier information field (CIF) in each of a certain cell and at least one secondary cell, such that downlink and uplink carrier components of the certain cell and the at least one secondary cell share a common CIF value;
    via a transmitter, transmitting a configuration message to configure cells of the user equipment, wherein the configuration message comprises respective first information including the common CIF value for carrier component identification of the certain cell, and second information of the certain cell that indicates one or more cell indexes of one or more corresponding secondary cells that the certain cell is capable of serving, and third information that indicates a cell index of a cell serving the certain cell; and
    when the configuration message is transmitted, scheduling the carrier component based on at least the first, second, and third information and using the common CIF value;
    wherein the configuration message further comprises a fourth information that indicates whether the first information is mandatory or optional; and
    wherein the first information is mandatory when the certain cell is configured to serve at least one of the one or more corresponding secondary cells.

2. The method of claim 1, wherein the certain cell is a primary cell, and wherein the second information of the primary cell indicates the one or more cell indexes of the one or more corresponding secondary cells that the primary cell is capable of serving.

3. The method of claim 1, wherein the certain cell is a secondary cell, and the third information indicates a cell index of a cell serving the certain cell.

4. The method of claim 1, wherein the certain cell is a secondary cell and the second information of the certain cell indicates the one or more cell indexes of the one or more corresponding secondary cells that the secondary cell is capable of serving.

5. The method according to claim 1, wherein the certain cell is one of a cross-scheduling primary cell and a cross-scheduling secondary cell.

* * * * *